(12) United States Patent
Dionisi et al.

(10) Patent No.: US 11,412,752 B2
(45) Date of Patent: Aug. 16, 2022

(54) STABILIZED FAT BLEND

(71) Applicant: NESTEC S.A., Vevey (CH)

(72) Inventors: Fabiola Dionisi, Epalinges (CH);
Christoph Reh, Epalinges (CH);
Lennart Fries, Belmont-sur-Lausanne (CH); Christian Kjolby, Bretigny-sur-Morrens (CH); Patricia Rossi, Rivaz (CH)

(73) Assignee: Societe des Produits Nestle S.A., Vevey (CH)

( * ) Notice: Subject to any disclaimer, the term of this patent is extended or adjusted under 35 U.S.C. 154(b) by 5 days.

(21) Appl. No.: 16/310,635

(22) PCT Filed: Jun. 19, 2017

(86) PCT No.: PCT/EP2017/064974
§ 371 (c)(1),
(2) Date: Dec. 17, 2018

(87) PCT Pub. No.: WO2017/220511
PCT Pub. Date: Dec. 28, 2017

(65) Prior Publication Data
US 2019/0327998 A1    Oct. 31, 2019

(30) Foreign Application Priority Data
Jun. 20, 2016 (EP) .................... 16175326

(51) Int. Cl.
*A23D 9/06* (2006.01)
*A23D 9/007* (2006.01)
*C11B 5/00* (2006.01)

(52) U.S. Cl.
CPC ........... *A23D 9/06* (2013.01); *A23D 9/007* (2013.01); *C11B 5/0085* (2013.01)

(58) Field of Classification Search
CPC .................... A23D 9/06; A23D 9/007
See application file for complete search history.

(56) References Cited

U.S. PATENT DOCUMENTS

| | | | |
|---|---|---|---|
| 3,071,475 A | | 1/1963 | Stohr |
| 5,298,271 A | * | 3/1994 | Takashina ............. A23L 3/3418 426/312 |
| 5,843,497 A | * | 12/1998 | Sundram ................ A21D 2/145 426/2 |
| 2007/0212453 A1 | | 9/2007 | Niness et al. |
| 2011/0236550 A1 | * | 9/2011 | Perlman ................... A23D 9/06 426/546 |

FOREIGN PATENT DOCUMENTS

| | | |
|---|---|---|
| CN | 104582495 A | 4/2015 |
| GB | 2492080 | 12/2012 |
| WO | 0038541 | 7/2000 |
| WO | 2015155024 | 10/2015 |

OTHER PUBLICATIONS

Sanchez-Escalante et al. "The effects of ascorbic acid, taurine, carnosine and rosemary powder on colour and lipid stability of beef patties packaged in modified atmosphere" Meat Science, 2001, vol. 56, pp. 421-429.
Chinese Office Action for Chinese App No. 201780035940.6 dated Nov. 11, 2021.

* cited by examiner

*Primary Examiner* — Jeffrey P Mornhinweg
(74) *Attorney, Agent, or Firm* — K&L Gates LLP (57) ABSTRACT

The present invention relates to a process for forming a stabilized fat blend. Further aspects of the invention are a composition comprising a fat blend and micronized antioxidant-containing vegetable material. The invention also provides for the use of micronized antioxidant-containing vegetable material to protect a fat blend from oxidation, for example a fat blend with a low level of saturated fat.

18 Claims, 7 Drawing Sheets

STABILIZED FAT BLEND

CROSS REFERENCE TO RELATED APPLICATIONS

The present application is a National Stage of International Application No. PCT/EP2017/064974, filed on Jun. 19, 2017, which claims priority to European Application No. 16175326.4, filed on Jun. 20, 2016, the entire contents of which are being incorporated herein by reference.

FIELD OF THE INVENTION

The present invention relates to a process for forming a stabilized fat blend. Further aspects of the invention are a composition comprising a fat blend and micronized antioxidant-containing vegetable material. The invention also provides for the use of micronized antioxidant-containing vegetable material to protect a fat blend from oxidation, for example a fat blend with a low level of saturated fat.

BACKGROUND OF THE INVENTION

Fats used in consumer products such as foods need to be stable against oxidation. Rancidity of the fat is perceived as a severe defect of the product. The requirement of having stable fats leads to the use of highly stable saturated oils, for example fully hydrogenated palm kernel oil. Since a high consumption of saturated fatty acids (SFA) has been associated with increased risk of cardiovascular diseases, authorities and consumers require SFA reduction in food products. Essential fatty acids such as omega-3 fatty acids are beneficial in the diet, but these unsaturated fats are sensitive to oxidation and so their use in food products is limited.

In order to stabilize less-saturated oils in food products, highly effective synthetic antioxidants may be added, but this is not always desirable to consumers who seek products with familiar ingredients of natural origin. Antioxidants may be delivered in the form of extracts, which are purified from plant material sources. Due to the extensive processing required to extract and selectively purify antioxidants from plant materials, and the need for carrier materials, those extracts may not be perceived as natural ingredients by consumers.

Natural antioxidants may be delivered in the form of dried plant materials such as rosemary leaves. However, such plant materials may alter the mouthfeel of food products to which they are added, and in liquid fats will tend to settle under gravity. Low SFA fats generally have a lower viscosity at a given temperature than saturated fats and so it is even more challenging to disperse particles in them without problems of sedimentation. Furthermore, the antioxidant potential of dried plant particles is limited, since the amount of antioxidant liberated by the particles into the fat phase is low.

Hence, there is a clear need in the art to find better solutions to provide stabilized fats, in particular using components which do not adversely affect the organoleptic properties of the fats and which are perceived as natural by consumers.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to".

SUMMARY OF THE INVENTION

An object of the present invention is to improve the state of the art and to provide an improved solution to overcome at least some of the inconveniences described above, or at least to provide a useful alternative. The object of the present invention is achieved by the subject matter of the independent claims. The dependent claims further develop the idea of the present invention.

Accordingly, the present invention provides in a first aspect a process for forming a stabilized fat blend comprising the steps:
  a) providing a composition comprising a first fat component and at least 30 wt. % antioxidant-containing vegetable material and grinding the composition to form a composition comprising micronized antioxidant-containing vegetable material incorporated in the first fat component; and
  b) adding a second fat component such that the resulting composition comprises less than 30 wt. % micronized antioxidant-containing vegetable material.

In a second aspect, the invention relates to a composition comprising a fat blend and micronized antioxidant-containing vegetable material, the composition containing less than 90% saturated fatty acids by weight of the total fatty acids in the composition. A third aspect of the invention relates to the use of a micronized antioxidant-containing vegetable material to protect a fat blend from oxidation.

Surprisingly, the inventors have found that by milling antioxidant-containing vegetable material in fat at a high total solids (for example greater than 30 wt. %) and then diluting the mixture with more fat, a dispersion can be obtained which is stable against sedimentation. Without wishing to be bound by theory, the inventors believe that a high viscosity during milling (due to the high total solids) more effectively coats the surface of the micronized particles and reduces their tendency to sediment.

DETAILED DESCRIPTION OF THE INVENTION

Consequently the present invention relates in part to a process for forming a stabilized fat blend comprising the steps: (a) providing a composition comprising (for example consisting of) a first fat component and at least 30 wt. % antioxidant-containing vegetable material (for example at least 40 wt. % antioxidant-containing vegetable material) and grinding the composition to form a composition comprising (for example consisting of) micronized antioxidant-containing vegetable material incorporated in the first fat component; and (b) adding a second fat component such that the resulting composition comprises less than 30 wt. % micronized antioxidant-containing vegetable material (for example less than less than 15 wt. % micronized antioxidant-containing vegetable material, for example less than less than 1 wt. % micronized antioxidant-containing vegetable material.

The composition of step (a) of the process of the invention may comprise between 30 and 70 wt. % antioxidant-containing vegetable material, for example between 35 and 65 wt. % antioxidant-containing vegetable material. The content of antioxidant-containing vegetable material may be on a dry basis.

In the context of the present invention, the term fat refers to triglycerides. Fats are the chief component of animal adipose tissue and many plant seeds. Fats which are generally encountered in their liquid form are commonly referred to as oils. In the present invention the terms oils and fats are interchangeable. The term fat blend refers to a homogeneous mixture of at least two fats.

In the present context the term "micronize" relates to a process wherein the particles are processed to particle size distributions having a D90 below 250 micrometers (μm), for example below 100 μm, for example below 50 μm, for further example below 20 μm. Similarly, the term "micronized" relates to particles with a D90 particle size below 250 micrometers (μm), for example below 100 μm, for example below 50 μm, for further example below 30 μm. Milling may for example be performed in a ball mill by wet milling or dry milling.

The antioxidant-containing vegetable material according to the process of the invention may be selected from the group consisting of cocoa, coffee including green coffee, green tea, ginseng, chicory, bamboo, bay, clove, cinnamon, oregano, turmeric, cumin, parsley, basil, curry powder, mustard seed, ginger, pepper, chili powder, paprika, chamomile, garlic, coriander, onion, cardamom, rosemary, sage, thyme, marjoram, tarragon, peppermint, oregano, herbs of the genus *Satureja*, basil, dill weed and combinations of these. Other sources of vegetable material containing natural antioxidants include dried fruits, dried vegetables, nuts, flowers, grains and cereals. For example the antioxidant-containing vegetable material may be selected from the group consisting of mint, basil, bay, coriander, tea (for example green tea), coffee, cinnamon, rosemary, oregano, sage and combinations of these. For example the antioxidant-containing vegetable material may be selected from the group consisting of basil, bay, coriander, tea (for example green tea), coffee, cinnamon, rosemary and combinations of these. For further example the antioxidant-containing vegetable material may be selected from the group consisting of tea (for example green tea), coffee, rosemary and combinations of these. For further example the antioxidant-containing vegetable material may be selected from the group consisting of tea (for example green tea), coffee and combinations of these.

The composition ground in the process of the invention may be ground using a ball mill, (for example a planetary ball mill or a stirred media bead mill), a homogenizer, a high shear mixer, an impact mill or a roller mill. For example the composition ground in the process of the invention may be ground using a ball mill, (for example a planetary ball mill or a stirred media bead mill), an impact mill or a roller mill. For further example the composition ground in the process of the invention may be ground using a ball mill. Devices commonly found in domestic kitchens such as blenders or a pestle and mortar are generally not capable of forming micronized vegetable material as they do not break the material into small enough particles. The micronized antioxidant-containing vegetable material may have a Sauter mean diameter ($D_{3,2}$) of less than 12 μm, for example less than 11 μm, for example between 2 and 11 μm, for example between 2.5 and 8.5 μm, for further example between 3 and 7.5 μm. The Sauter mean diameter, sometimes called the surface mean, is especially relevant to situations where the active surface area is important. Micronized antioxidant-containing vegetable material having these ($D_{3,2}$) values were found to be particularly effective at preventing oxidation of the fat in which they were dispersed and being stable against sedimentation.

Step a) and/or step b) may be performed under reduced pressure or under inert gas in the process of the invention. Limiting the contact of the fats with oxygen during processing reduces the risk of oxidation. The reduced pressure may be less than 20 kPa (absolute), for example less than 10 kPa (absolute). The inert gas may be nitrogen or argon.

Grinding materials in fat may in itself lead to oxidation of the fat. This is a particular problem with more sensitive fats such as those having a high level of unsaturation. By grinding the antioxidant-containing vegetable material in a fat having a high SFA content and then combining it with a fat having a lower SFA content, a fat blend with an overall low SFA acid content can be obtained while limiting oxidative damage. It is important to protect the fat from even very small extents of oxidation during processing as this greatly increases the stability of the fat over long storage times. Fats with higher SFA contents tend to be more viscous, so using higher SFA fats in the grinding step increases the viscosity, which may coat the surface of the micronized particles more effectively and reduce their tendency to sediment. With high levels of antioxidant-containing material in the composition ground in step (a), the amount of the higher SFA fat in the overall blend can be advantageously limited. The first fat component in the process of the invention may have a higher saturated fatty acid content than the second fat component. In this context the fatty acids (saturated or un-saturated) are almost all esterified to the glucose backbone of triglyceride molecules rather than being present as free fatty acids.

The composition in step a) of the process of the invention may contain more than 40% saturated fatty acids by weight of the total fatty acids in the composition (for example more than 50%, more than 70%, or more than 90% saturated fatty acids by weight of the total fatty acids in the composition). The first fat component may have a saturated fatty acid content greater than 40% (for example greater than 50%, greater than 70%, or greater than 90%), for example the first fat component may be a fully or partially hydrogenated vegetable oil, or an interesterified fat. For further example, the first fat component may be selected from the group consisting of coconut oil, palm kernel oil, anhydrous milk fat, lard, beef tallow, duck fat, chicken fat, cocoa butter, shea butter, kokum butter, illipe butter, moringa oleifera kernel oil, from kernels, allanblackia oil, sal butter, palm kernel oil, coconut oil, palm oil, algal oil and combinations, hydrogenation products, fractionation products and interesterification products of these.

The second fat component may have a saturated fatty acid content below 40% (for example below 30% or below 20%), for example the second fat component may be selected from the group consisting of rapeseed oil, corn oil, olive oil, soybean oil, sunflower oil, safflower oil, groundnut oil, cottonseed oil, linseed oil, nut oil (such as walnut, hazelnut, almond, avocado, brazil, pistacchio, cashew, macadamia, pecan, pine nut, mongongo, beech), chia oil, flaxseed oil, rice bran oil, wheat germ oil, mustard seed oil, coriander seed oil, black current seed oil, grapeseed oil, apricot kernel oil, algal oil, microalgal oil, palm olein, fish oil and combinations, fractionation products and interesterification products of these. For further example the second fat component may be a high oleic variant of a vegetable fat, such as a fat selected from the group consisting of high oleic sunflower oil, high oleic canola oil, high oleic safflower oil, high oleic soybean oil and combinations of these. The second fat component may itself be a blend, for example it may be comprise a higher SFA fat and a lower SFA fat to reach the desired overall physical properties. Product applications often require fat blends with a particular SFA content providing the desired texture, handling properties and mouthfeel; not too hard and not too fluid.

The ratio of the first fat component to the second fat component in the process of the invention may range from 1:1 to 1:100. The composition may comprise no other fats than the first and second fat component, or the composition may comprise less than 5 wt. % of other fats, for example less than 2 wt. % of other fats.

The stabilized fat blend formed in the process of the invention may be used as a food ingredient directly, or it may be further processed into an emulsion or a powder. In an embodiment of the invention the composition of step (b) is formed into a powder, for example by spray chilling or by forming an oil in water emulsion and spray drying.

In an embodiment of the process of the invention, the quantity of the first fat component may be such that it is present in the composition formed in step b) at a level between 70 and 90 wt. % (for example between 75 and 85 wt. %), and the quantity of the second fat component may be such that it is present in the composition formed in step b) at a level between 10 and 30 wt. % (for example between 15 and 25 wt. %), wherein the first fat component has a saturated fatty acid content of between 85 and 95% and the second fat component has a saturated fatty acid content of between 5 and 15%. The first fat component may for example be a hydrogenated palm kernel oil (for example a fully hydrogenated palm kernel oil) and the second fat component may for example be a high oleic vegetable oil such as a high oleic sunflower oil. The stabilized fat blend so formed by this embodiment of the process of the invention may be combined with other ingredients to form a coffee mix or a powdered creamer, for example wherein the micronized antioxidant-containing vegetable material comprises tea (for example green tea) or coffee. Coffee mixes typically contain soluble coffee, sugar and creamer. They provide a quick and easy way to produce a cup of coffee by simply adding hot water.

In an embodiment of the process of the invention, the quantity of the first fat component may be such that it is present in the composition formed in step b) at a level between 75 and 95 wt. % (for example between 80 and 90 wt. %), and the quantity of the second fat component may be such that it is present in the composition formed in step b) at a level between 5 and 25 wt. % (for example between 10 and 20 wt. %), wherein the first fat component has a saturated fatty acid content of between 60 and 70% and the second fat component has a saturated fatty acid content of between 5 and 15%. The first fat component may for example be an interesterified palm stearin and the second fat component may for example be a high oleic vegetable oil such as a high oleic sunflower oil. The stabilized fat blend so formed by this embodiment of the process of the invention may be combined with other ingredients to form a concentrated bouillon (such as a bouillon cube), for example wherein the micronized antioxidant-containing vegetable material is selected from the group consisting of chicory, bamboo, bay, clove, cinnamon, oregano, tea, turmeric, cumin, parsley, basil, curry powder, mustard seed, ginger, pepper, chili powder, paprika, garlic, coriander, onion, cardamom, rosemary, sage, thyme, marjoram, tarragon, peppermint, oregano, herbs of the genus *Satureja*, basil, dill weed and combinations of these, for further example wherein the micronized antioxidant-containing vegetable material is selected from the group consisting of basil, bay, coriander, rosemary and combinations of these.

In an embodiment of the process of the invention, the quantity of the first fat component may be such that it is present in the composition formed in step b) at a level between 75 and 95 wt. % (for example between 80 and 90 wt. %), and the quantity of the second fat component may be such that it is present in the composition formed in step b) at a level between 5 and 25 wt. % (for example between 10 and 20 wt. %), wherein the first fat component has a saturated fatty acid content of between 50 and 60% and the second fat component has a saturated fatty acid content of between 5 and 15%. The first fat component may for example be a confectionery filling fat and the second fat component may for example be a high oleic vegetable oil such as high oleic sunflower oil. The stabilized fat blend so formed by this embodiment of the process of the invention may be combined with other ingredients to form a confectionery filling, for example wherein the micronized antioxidant-containing vegetable material is selected from the group consisting of mint, cocoa, tea (for example green tea), coffee, cinnamon and combinations of these.

In an embodiment of the process of the invention, the quantity of the first fat component may be such that it is present in the composition formed in step b) at a level between 70 and 90 wt. % (for example between 75 and 85 wt.), and the quantity of the second fat component may be such that it is present in the composition formed in step b) at a level between 10 and 30 wt. % (for example between 15 and 25 wt. %), wherein the first fat component has a saturated fatty acid content of between 40 and 50% and the second fat component has a saturated fatty acid content of between 5 and 15%. The first fat component may for example be a margarine, butter or a shortening, and the second fat component may for example be a high oleic vegetable oil such as a high oleic sunflower oil. The stabilized fat blend so formed by this embodiment of the process of the invention may be used as the fat in a puff pastry, for example wherein the micronized antioxidant-containing vegetable material is selected from the group consisting of chicory, bamboo, bay, clove, cinnamon, oregano, turmeric, cumin, parsley, basil, curry powder, mustard seed, ginger, pepper, chili powder, paprika, green tea, garlic, coriander, onion, cardamom, rosemary, sage, thyme, marjoram, tarragon, peppermint, oregano, herbs of the genus *Satureja*, basil, dill weed and combinations of these, for further example wherein the micronized antioxidant-containing vegetable material is selected from the group consisting of mint, basil, bay, coriander, cinnamon, rosemary and combinations of these.

In an embodiment of the process of the invention, the quantity of the first fat component may be such that it is present in the composition formed in step b) at a level between 0.2 and 2 wt. % (for example between 0.5 and 1.5 wt.), and the quantity of the second fat component may be such that it is present in the composition formed in step b) at a level between 98 and 99.8 wt. % (for example between 98.5 and 99.5 wt. %), wherein the first fat component has a saturated fatty acid content of between 80 and 95% and the second fat component has a saturated fatty acid content of between 5 and 40%. The first fat component may for example be selected from the group consisting of shea butter, coconut oil, palm kernel oil, hydrogenation products, fractions and mixtures of these, and the second fat component may for example be a fat liquid at 25° C., for example a vegetable oil selected from the group consisting of olive oil, soybean oil, sunflower oil, safflower oil, groundnut oil, nut oils (for example walnut, hazelnut or almond), rice bran oil, mustard seed oil, algal oil and fish oil. The stabilized fat blend so formed by this embodiment of the process of the invention may be used as a stabilized oil in savoury foods, for example wherein the micronized antioxidant-containing vegetable material is selected from the group consisting of chicory, bamboo, bay, clove, cinnamon, oregano, turmeric, cumin, parsley, basil, curry powder, mustard seed, ginger, pepper, chili powder, paprika, garlic, coriander, onion, cardamom, rosemary, sage, thyme, marjoram, tarragon, peppermint, oregano, herbs of the genus *Satureja*, basil, dill weed and combinations of these, for further example wherein the micronized antioxidant-containing vegetable material is selected from the group consisting of mint, basil, bay, coriander, cinnamon, rosemary and combinations of these. The stabilized fat blend so formed by this embodiment of the process of the invention may be used as a stabilized oil in sweet foods such as cereals and porridges, for example wherein the micronized antioxidant-containing vegetable material is selected from the group consisting of clove, cinnamon, cardamom, ginger, peppermint and combinations of these.

A further aspect of the invention is a composition comprising a fat blend and micronized antioxidant-containing vegetable material, the composition containing less than 90% saturated fatty acids (for example less than 80%, for further example less than 70%, for further example less than 50%) by weight of the total fatty acids in the composition. The micronized antioxidant-containing vegetable material stabilizes the fat blend against oxidation more effectively than the non-micronized vegetable material, and may be preferred by consumers over antioxidant extracts. In another aspect the invention provides a composition obtainable by the process of the invention. The micronized antioxidant-containing vegetable material in the fat blend obtained by the process of the invention have good stability against sedimentation, for example when dispersed in the fat blend.

The micronized antioxidant-containing vegetable material in the composition of the invention may have a Sauter mean diameter ($D_{3,2}$) of less than 12 μm, for example less than 11 μm, for example between 2 and 11 μm, for example between 2.5 and 8.5 μm, for further example between 3 and 7.5 μm. The fat blend according to the composition of the invention may comprise a high oleic vegetable oil, for example selected from the group consisting of high oleic sunflower oil, high oleic canola oil, high oleic safflower oil, high oleic soybean oil and combinations of these.

The composition of the invention may be a food composition, for example it may be selected from the group consisting of a powdered beverage (for example a powdered creamer, a coffee mix, or a beverage powder to be dissolved in cold water or milk), a cereal product (for example a porridge or a breakfast cereal), a confectionery filling, an ice cream coating, a culinary sauce and a concentrated bouillon.

In an embodiment, the composition of the invention may be a coffee mix or powdered creamer wherein the fat blend comprises between 70 and 90 wt. % of a first fat component (for example between 75 and 85 wt. %), and between 10 and 30 wt. % of a second fat component (for example between 15 and 25 wt. %), wherein the first fat component has a saturated fatty acid content of between 85 and 95% and the second fat component has a saturated fatty acid content of between 5 and 15%. The first fat component may for example be a hydrogenated palm kernel oil (for example a fully hydrogenated palm kernel oil) and the second fat component may for example be a high oleic vegetable oil such as a high oleic sunflower oil. The micronized antioxidant-containing vegetable material in the coffee mix or powdered creamer may be tea (for example green tea) or coffee.

In an embodiment, the composition of the invention may be a concentrated bouillon (for example as a bouillon cube) wherein the fat blend comprises between 75 and 95 wt. % (for example between 80 and 90 wt. %) of a first fat component, and between 5 and 25 wt. % (for example between 10 and 20 wt. %) of a second fat component, wherein the first fat component has a saturated fatty acid content of between 60 and 70% and the second fat component has a saturated fatty acid content of between 5 and 15%. The first fat component may for example be an interesterified palm stearin and the second fat component may for example be a high oleic vegetable oil such as a high oleic sunflower oil. The micronized antioxidant-containing vegetable material in the concentrated bouillon may be selected from the group consisting of chicory, bamboo, bay, clove, cinnamon, oregano, turmeric, cumin, parsley, basil, curry powder, mustard seed, ginger, pepper, chili powder, paprika, garlic, coriander, onion, cardamom, rosemary, sage, thyme, marjoram, tarragon, peppermint, oregano, herbs of the genus *Satureja*, basil, dill weed and combinations of these. For example the micronized antioxidant-containing vegetable material in the concentrated bouillon may be selected from the group consisting of basil, bay, coriander, rosemary and combinations of these.

In an embodiment, the composition of the invention may be a confectionery filling wherein the fat blend comprises between 75 and 95 wt. % (for example between 80 and 90 wt. %) of a first fat component, and between 5 and 25 wt. % (for example between 10 and 20 wt. %) of a second fat component, wherein the first fat component has a saturated fatty acid content of between 50 and 60% and the second fat component has a saturated fatty acid content of between 5 and 15%. The first fat component may for example be a confectionery filling fat and the second fat component may for example be a high oleic vegetable oil such as a high oleic sunflower oil. The micronized antioxidant-containing vegetable material in the concentrated bouillon may be selected from the group consisting of mint, cocoa, tea (for example green tea), coffee, cinnamon and combinations of these.

In an embodiment, the composition of the invention may be a puff pastry wherein the fat blend comprises between 70 and 90 wt. % (for example between 75 and 85 wt.) of a first fat component, and between 10 and 30 wt. % (for example between 15 and 25 wt. %) of a second fat component, wherein the first fat component has a saturated fatty acid content of between 40 and 50% and the second fat component has a saturated fatty acid content of between 5 and 15%. The first fat component may for example be a margarine, butter or shortening and the second fat component may for example be a high oleic vegetable oil such as a high oleic sunflower oil. The micronized antioxidant-containing vegetable material in the puff pastry may be selected from the group consisting of chicory, bamboo, bay, clove, cinnamon, oregano, turmeric, cumin, parsley, basil, curry powder, mustard seed, ginger, pepper, chili powder, paprika, garlic, coriander, onion, green tea, cardamom, rosemary, sage, thyme, marjoram, tarragon, peppermint, oregano, herbs of the genus *Satureja*, basil, dill weed and combinations of these. For example the micronized antioxidant-containing vegetable material in the puff pastry may be selected from the group consisting of mint, basil, bay, coriander, cinnamon, rosemary and combinations of these.

In an embodiment, the composition of the invention may be a stabilized oil for use in savoury food applications wherein the fat blend comprises between 0.2 and 2 wt. % (for example between 0.5 and 1.5 wt.) of a first fat component, and between 98 and 99.8 wt. % (for example between 98.5 and 99.5 wt. %) of a second fat component, wherein the first fat component has a saturated fatty acid content of between 80 and 95% and the second fat component has a saturated fatty acid content of between 5 and 40%. The first fat component may for example be selected from the group consisting of coconut oil, palm kernel oil, hydrogenation products and mixtures of these, and the second fat component may for example be a fat liquid at 25° C., for example a vegetable oil selected from the group consisting of olive oil, soybean oil, sunflower oil, safflower oil, groundnut oil, nut oils (for example walnut, hazelnut or almond), rice bran oil, mustard seed oil, algal oil and fish oil. The micronized antioxidant-containing vegetable material in the stabilized oil for use in savoury food applications may be selected from the group consisting of chicory, bamboo, bay, clove, cinnamon, oregano, turmeric, cumin, parsley, basil, curry powder, mustard seed, ginger, pepper, chili powder, paprika, garlic, coriander, onion, cardamom, rosemary, sage, thyme, marjoram, tarragon, peppermint, oregano, herbs of the genus *Satureja*, basil, dill weed and combinations of these. For example the micronized antioxidant-containing vegetable material in the stabilized oil for use in savoury food applications may be selected from the group consisting of mint, basil, bay, coriander, cinnamon, rosemary and combinations of these.

The addition of micronized antioxidant-containing vegetable material to fat compositions provides an increase in oxidative stability. This may be used to extend the shelf-life of existing product formulations or it may allow a reduction in saturated fatty acids in the formulation whilst maintaining a comparable oxidative stability. For example it may allow a reduction of SFA of at least 10%, for example at least 20%, for further example at least 30%. The micronized antioxidant-containing vegetable material may be obtained by grinding antioxidant-containing vegetable material in fat at a level of at least 30% antioxidant-containing vegetable material by weight of the total antioxidant-containing vegetable material and fat. Accordingly, in a further aspect, the invention provides for the use of a micronized antioxidant-containing vegetable material to protect a fat blend from oxidation. The micronized antioxidant-containing vegetable material may be used to allow product reformulation at reduced saturated fat content without loss of oxidative stability.

Those skilled in the art will understand that they can freely combine all features of the present invention disclosed herein. In particular, features described for the process of the present invention may be combined with the product of the present invention and vice versa. Further, features described for different embodiments of the present invention may be combined. Where known equivalents exist to specific features, such equivalents are incorporated as if specifically referred to in this specification.

Further advantages and features of the present invention are apparent from the figures and non-limiting examples.

EXAMPLES

Example 1: Fat Blend Containing Micronized Coffee Particles

Figure 1:
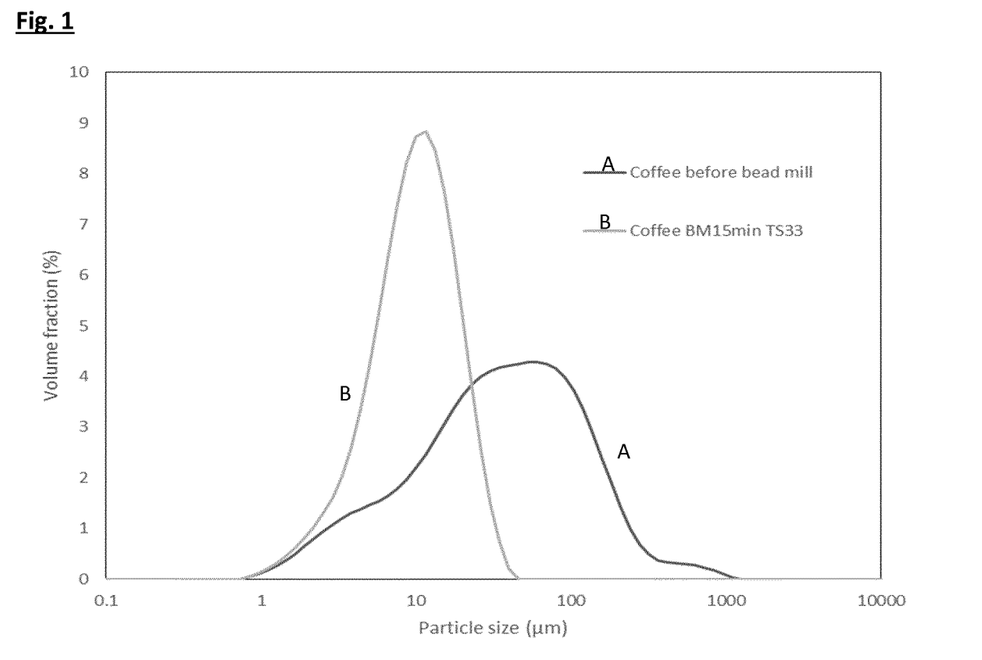
FIG. 1 shows the particle size distribution of coffee in example 1 before bead milling (A) and after 15 minutes of bead milling at a total solids of 33%. The x-axis is size (µm) and the y-axis is volume fraction (%).

Milling in Fully Hydrogenated Palm Kernel Oil 500 g fully hydrogenated palm kernel oil (FHPKO, supplier Fuji oils, type Ertilor 38/40) is melted at 50° C. in a measuring cup in an oven. 250 g fine roast & ground coffee particles (Robusta 7.2 Vietnam, CTN 78, particle size distribution given in FIG. 1, line "A") are dispersed in the oil with the help of a high-shear rotor-stator mixer (Polytron Kinematika PT 3100, head PT DA 3020/2EC, 1 min at 18000 rpm. The resulting suspension of coffee particles in oil (33% total solids, TS) is poured into grinding jars (volume: 125 ml) of the Retsch PM2 planetary ball mill, which were pre-heated to 50° C. Two thirds of the volume of each jar is filled with grinding media (2 mm $ZrO_2$ ceramic beads), one third is occupied by the oily suspension. The mill is run for 15 min at 500 rpm to micronize the coffee particles. No active heating is required during milling to keep the palm kernel oil above its melting point, as the heat released from friction inside the grinding jars is sufficient. The product temperature after 15 min of milling is recorded with a contact thermometer, ranging from 60-70° C. The obtained particle size distribution (shown in FIG. 1, line "B") is characterized by a surface weighted mean diameter (Sauter diameter, $D_{3,2}$ of 6.8 μm.

A fat blend composition is produced by mixing the suspension made as described above with sunflower oil (SFO) (SFA content 13%). The mixing ratio is adjusted such that the final oil blend composition contains 10 wt. % micronized coffee particles. Details of the obtained composition (#2) are given in table 1.

Milling in an Oil Blend (Palm Kernel Oil—Sunflower Oil)

Three blends of 250 g FHPKO, melted at 50° C., FUJI OIL and 250 g SFO are prepared. Suspensions of coffee particles (Robusta 7.2 Vietnam, CTN 78, particle size distribution given in FIG. 2) in the oil blend are prepared at 10%, 33% and 50% solids content (TS) using the Polytron Kinematika PT 3100 high shear mixer, head PT DA 3020/2EC, 1 min at 18000 rpm, until dispersed smoothly. Using the Retsch PM2 planetary ball mill, suspensions of micronized coffee are produced under the same conditions as described above (15 min, 500 rpm). The obtained particle size distributions (shown in FIG. 2) are characterized by a surface weighted mean diameter (Sauter diameter, $(D_{3,2})$ of 5.8 μm (TS 50), 6.7 μm (TS 33) and 8.8 μm (TS 10), respectively.

Fat blend compositions are produced by blending the obtained suspensions with further sunflower oil. The mixing ratio is adjusted such that the coffee concentration equals 10 wt % in all final compositions. No further blending with SFO is required for composition #6, as it is already at 10% TS. Details are given in table 1 (composition #4, 5, 6).

Figure 2:
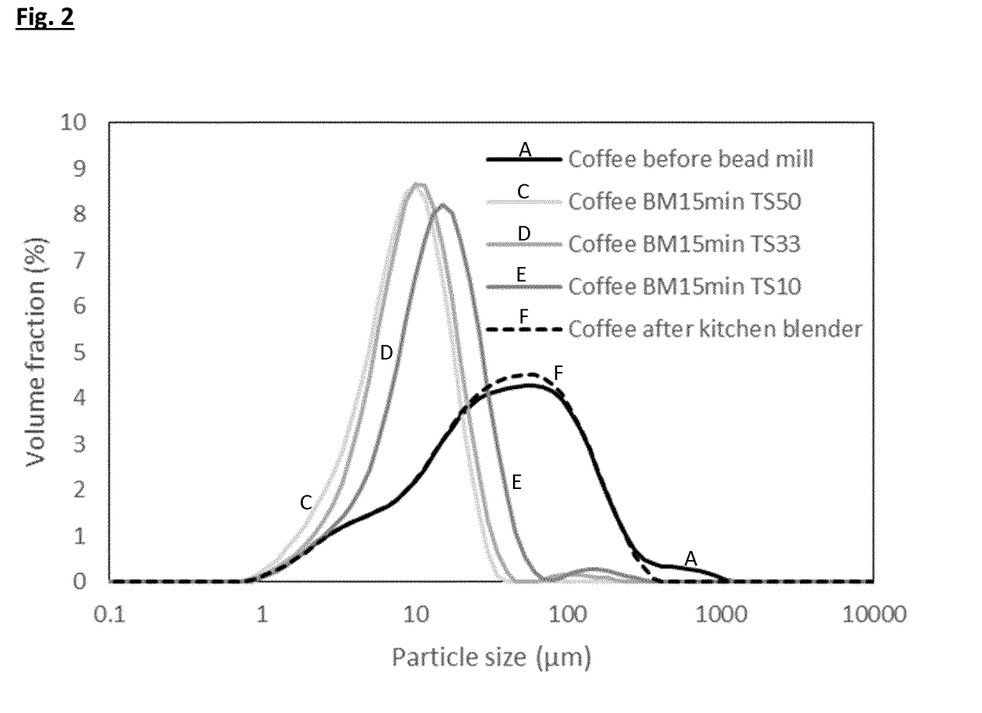
FIG. 2 shows the particle size distribution of coffee in example 1 before bead milling (A), after 15 minutes bead milling at 50% total solids (C), after 15 minutes bead milling at 33% total solids (D), after 15 minutes bead milling at 10% total solids (E), and after simply grinding in a kitchen blender (F). The x-axis is size (µm) and the y-axis is volume fraction (%).

For comparison, 55 g of the same coffee particles are mixed into a blend of 250 g FHPKO and 250 g SFO (TS 10) and agitated for 1 min with a kitchen blender (Moulinex/la Moulinette XXL) in order to prepare a suspension of fine coffee particles (composition 7). The obtained particle size distribution is represented in FIG. 2. It is characterized by a $D_{3,2}$ of 12.8 μm. It can be seen that the particle size before and after application of the kitchen blender are very similar. Only the fraction of particles larger than 300 μm is eliminated through the process.

Furthermore a suspension of 55 g coffee particles in a blend of 250 g FHPKO and 250 g SFO (TS 10) is prepared by mixing by hand with a whisk, without further milling (composition 8).

Characterization of the Stability of the Suspension with a Sedimentation Balance Sedimentation of particles is a critical parameter for the delivery of antioxidants from plant material sources, as sediments are perceived as defect by the consumer in the final product application (such as a coffee mix beverage preparation). Sedimentation is also problematic when processing suspensions as well as in transport and storage. Inhomogeneity and loss of active plant material due must be avoided. Therefore the sedimentation balance provides a reliable direct means to describe the stability of a suspension quantitatively.

Figure 3:
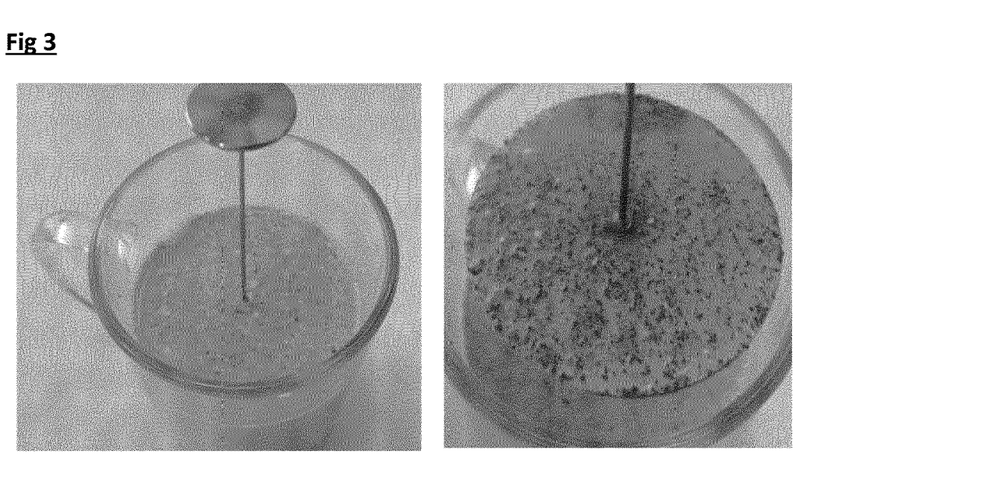
FIG. 3 shows photographs of the sedimentation plate.

Sedimentation was measured using a sedimentation balance: Mettler Toledo XP404S Excellence Plus with density determination kit. The cup with the immersed plate is shown in FIG. 3. Particles being heavier than the surrounding medium settle onto the plate, which allows recording the incremental mass of sediments as a function of time. The weighing plate has a cross sectional area 80% of that of the cup it is suspended in, without touching the walls. Fat blend compositions 4, 5, 6, 7 and 8 were heated to 50° C. in an oven to melt them. For each measurement 150 ml of suspension were poured into a pre-heated glass cup. The suspended weighing plate was introduced and the cup positioned on the balance. After 15 s of waiting time to let the convection inside the cup come to rest the measurement was started, tracking the cumulative mass of sediments on the plate at a frequency of 1 value per second. Five repetitions were performed per fat composition.

Figure 4:
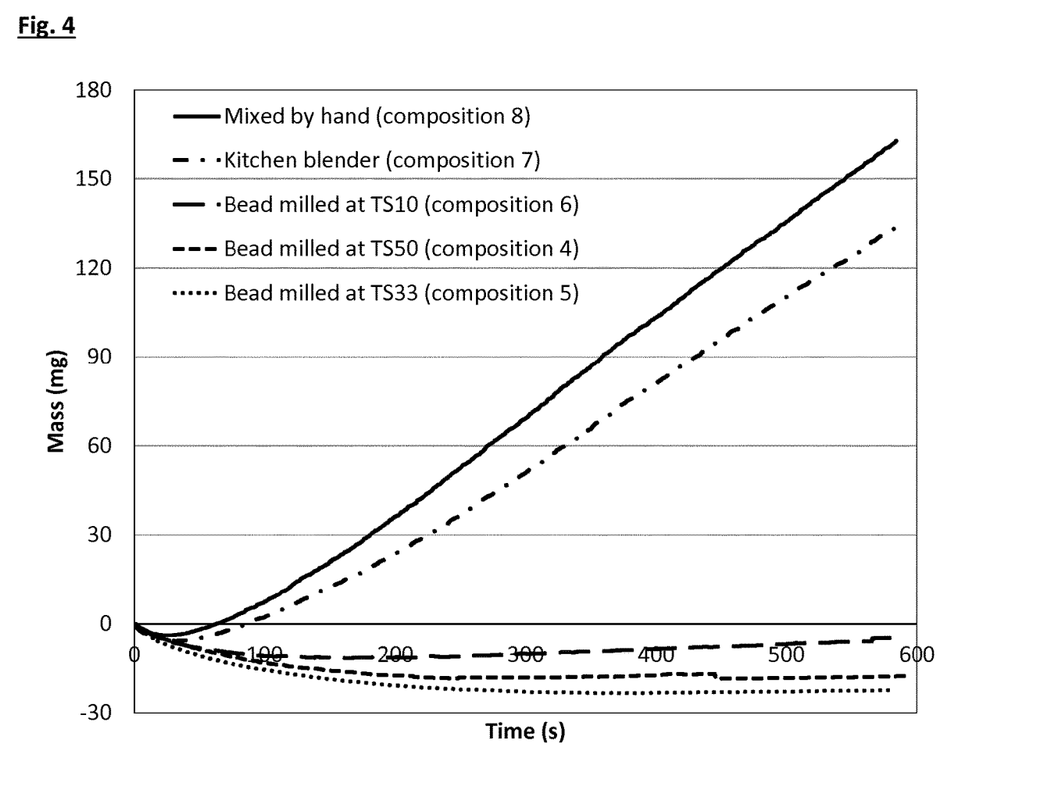
FIG. 4 is a plot of sedimentation results for coffee particles. The x-axis is time (s) and the y-axis is mass (mg).

The resulting graphs are shown in FIG. 4, where error bars indicate the standard deviation of the data from five repetitions per composition. A strong increase of the sediment mass can be seen for the simple mix of coffee particles in the oil blend (composition 8). Particles are continuously setting onto the suspended plate, resulting in a linear increase of the recorded particle mass. Applying a kitchen blender for reducing the coffee particles size and for stabilizing the suspension (composition 7) is only very partially successful, as the observed sediment mass increase follows a similar trend than for composition 8. A reduction of approximately 20% of the cumulative mass of sediments can be achieved by applying the kitchen blender in comparison to a simple hand mixing preparation. Compared to that, the suspensions

TABLE 3

| Composition # | Milling composition | $D_{3,2}$ (μm) | $D_{90,3}$ (μm) | Oil blend composition (weight-%) | Ratio FHPKO/SFO |
|---|---|---|---|---|---|
| 1 | 50% coffee bead milled in FHPKO | | | 10% FHPKO, 80% SFO, 10% coffee | 1/8 |
| 2 | 33% coffee bead milled in FHPKO | 6.8 | 19.2 | 20% FHPKO, 70% SFO, 10% coffee | 2/7 |
| 4 | 50% coffee bead milled in FHPKO + SFO (50/50) | 5.8 | 16.7 | 5% FHPKO, 85% SFO, 10% coffee | 1/17 |
| 5 | 33% coffee bead milled in FHPKO + SFO (50/50) | 6.7 | 19.2 | 10% FHPKO, 80% SFO, 10% coffee | 1/8 |
| 6 | 10% coffee bead milled in FHPKO + SFO (50/50) | 8.8 | 28.3 | 45% FHPKO, 45% SFO, 10% coffee | 1/1 |
| 7 | 10% coffee in FHPKO + SFO (50/50, blender) | 12.8 | 123 | 45% FHPKO, 45% SFO, 10% coffee | 1/1 |
| 8 | 10% coffee in FHPKO + SFO (50/50, hand mix) | 12.3 | 124 | 45% FHPKO, 45% SFO, 10% coffee | 1/1 |
| 9 | 50% coffee bead milled in FHPKO | | | 50% FHPKO, 49.2% SFO, 0.8% coffee | 1/1 |
| 10 | 10% coffee in FHPKO + SFO (50/50, hand mix) | | | 49.6% FHPKO, 49.6% SFO, 0.8% coffee | 1/1 |
| 11 | NA | NA | NA | 50% FHPKO, 50% SFO | 1/1 | of coffee particles micronized in oil in the bead perform systematically better (compositions 4, 5 and 6). Here, no clear increase of the mass of sediments over time is recorded. Slightly negative values of the mass on the plate are even observed, indicating creaming effects such as rising of bubbles and lighter particles, thereby increasing the average density below the weighing plate. It can be assumed that those creaming effects apply in equivalent amplitude to all 5 compositions characterized here. The observed differences between the samples are related to the sedimentation of particles and not motion in the liquid phase, as the analyses were all prepared according to the same protocol. Comparing the sedimentation curves of composition 4, 5 and 6 among each other, a similar performance of samples milled at 50% TS (composition 4) and milled at 33% TS (composition 5), is recorded, within very small error margins. Although the sedimentation curve is following the same overall trend, composition 6 containing coffee particles bead milled at low solids concentration (TS 10) is characterized by a significantly higher mass of sediments compared to compositions 4 and 5. It is therefore considered advantageous to perform the bead milling of coffee particles at high solids concentration for the benefit of suspension stability.

Characterization of Oxidative Stability of the Suspensions Via Rancimat

To test the potential of natural plant extracts acting as antioxidant delivery system in oil blends, the Rancimat system offers a simple and reliable tool (Rancimat from Methrom Schweiz AG, Switzerland). The stability of oils is characterized by the induction time before oxidation products are released from the heated and aerated oil. This test was performed on oil compositions containing micronized coffee particles (composition #9 and 10, see table 1), which contain a coffee particle concentration of 8000 ppm (0.8%). For comparison a pure oil blend (50/50 mix of FHPKO and SFO) without addition of coffee particles was treated in the bead mill for 15 min at 500 rpm. This blend was then further diluted (ratio 62.5:1) with the initial unprocessed FHPKO-SFO oil blend before bead milling to match the dilution applied for compositions 9 and 10, obtaining composition 11.

The Rancimat test was performed at 110° C. All measurements were performed in duplicates. As a measure for the oxidative stability of the oil blend composition, the induction time is plotted in FIG. 5.

Figure 5:
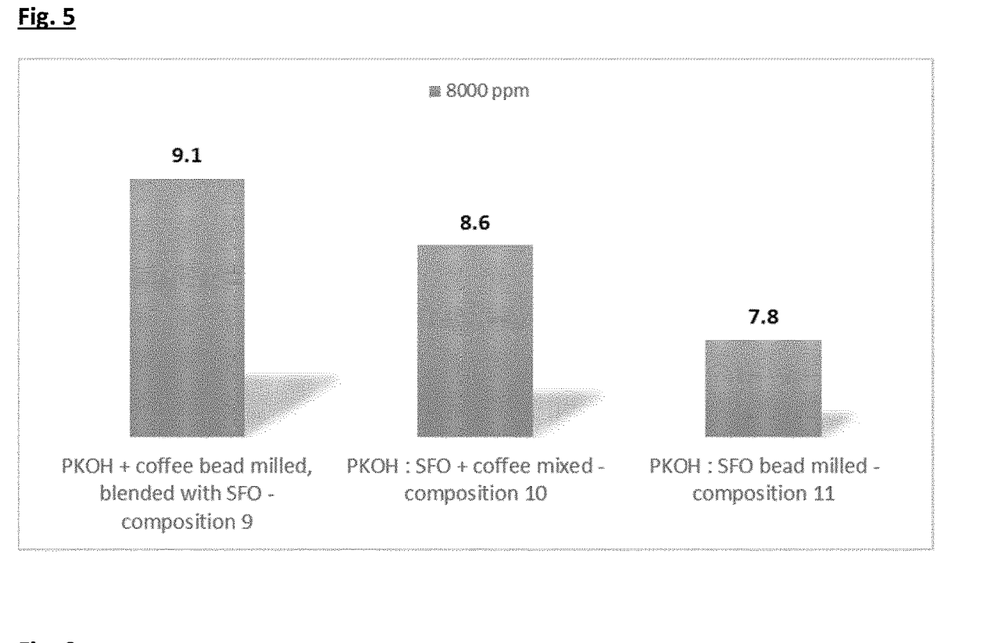
FIG. 5 is a plot of Rancimat induction time (h) for samples from example 1.

Composition 11, without addition of coffee particles, but processed equally as the compositions 9 and 10, is characterized by an induction time of 7.8 hours. An improvement of this value is registered for all compositions comprising coffee particles. For composition 10, where the initial coffee particles were dispersed without further micronization step at a concentration of 8000 ppm, an induction time of 8.6 hours was measured. The highest resistance against oxidation, expressed as an induction time of 9.1 was found for composition 9, also containing 8000 ppm of micronized coffee particles. This improvement of oil stability confirms the benefit of micronization on the performance of natural antioxidant-rich particles.

Example 2: Fat Blend Containing Micronized Green Tea Particles

Figure 6:
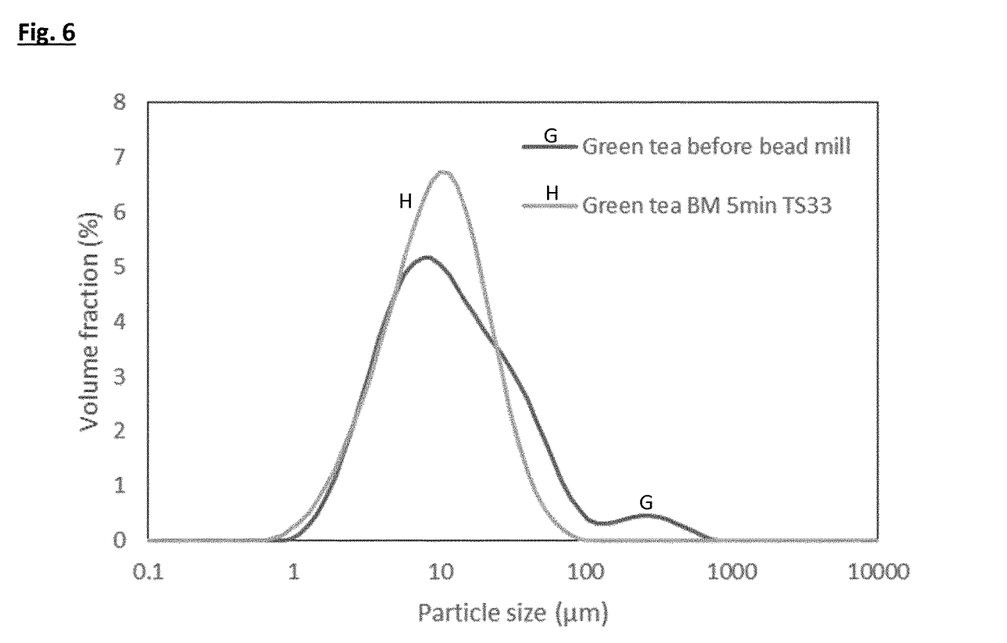
FIG. 6 shows the particle size distribution of green tea in example 2 before bead milling (G) and after 5 minutes of bead milling at a total solids of 33%. The x-axis is size (µm) and the y-axis is volume fraction (%).
Figure 7:
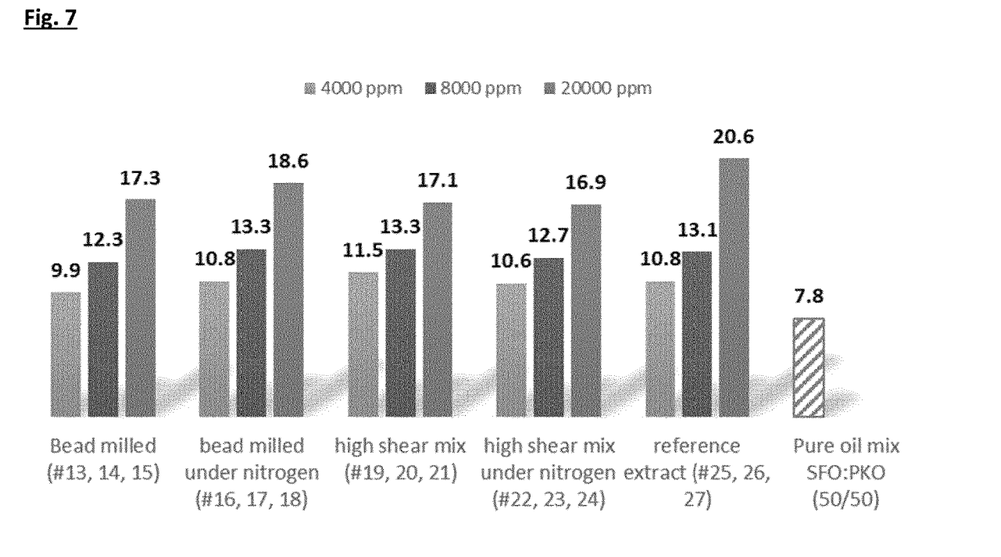
FIG. 7 is a plot of Rancimat induction time (h) for samples from example 2.

Fine ground green tea leaves type Kabusecha Matcha from Japan were purchased at Le Monde des Epices, Payerne (Switzerland). 250 g of the matcha tea were dispersed in 500 g of a 50/50 blend of palm kernel oil (FUJI OIL Europe Ertilor PK 26/28) and sunflower oil (Florin, Switzerland) with the help of a high-shear rotor-stator mixer (Polytron Kinematika PT 3100, head PT DA 3020/2EC, 1 min at 18000 rpm. The resulting suspension of green tea particles in oil (33% TS) is characterized by a particle size distribution (measured by laser diffraction with Malvern Mastersizer 2000) as shown in FIG. 6, with a surface-weighted mean diameter (Sauter diameter or $D_{3,2}$) of 6.0 μm and a $D_{90}$ of 40.7 μm.

The suspension was poured into grinding jars (volume: 125 ml) of the Retsch PM2 planetary ball mill, which were pre-heated to 50° C. Two thirds of the volume of each jar is filled with grinding media (2 mm $ZrO_2$ ceramic beads), one third is occupied by the oily suspension. The mill is run for 5 min at 500 rpm to micronize the green tea particles. No active heating is required during milling to keep the palm kernel oil above its melting point, as the heat released from friction inside the grinding jars is sufficient. The product temperature after 5 min of milling is recorded with a contact thermometer, ranging from 50-60° C. The obtained particle size distribution (shown in FIG. 6) is characterized by a surface-weighted mean diameter $D_{3,2}$ of 6.0 μm and a $D_{90}$ of 23.6 μm. As the green tea powder is already very finely ground from the supplier, the bead milling treatment mainly eliminates the coarse particle fraction and achieves a smooth and stable homogeneous suspension.

To investigate the effect of oil handling conditions and of the bead milling process in particular on the oxidative stability of oil blends containing micronized green tea particles, an analogous test to the one described above was performed, where the oil blend was rendered inert by first degassing it under vacuum and then re-gassing it with Argon (3×). Nitrogen blanketing was applied throughout all further oil handling steps, including bead milling.

Six fat blend compositions were produced by mixing the suspensions made as described above with more of the initial mix of palm kernel oil (PKO) and sunflower oil (SFO). The mixing ratio was adjusted such that the final oil blend compositions contained 4000, 8000 and 20000 ppm micronized green tea particles. Details of the obtained compositions (#13-18) are given in table 2.

For comparison six fat blend compositions (#19-24) were produced using the initial mix of green tea particles after high-shear-mixing (HS), but without application of the bead mill. For compositions #19, 20 and 21 the standard oil blend was used, while for composition #16 the oil blend that was degassed and rendered inert was used. The mixing ratio was adjusted such that the final oil blend compositions contained 4000, 8000 and 20000 ppm green tea particles.

As reference, to assess the efficiency of micronized green tea particles as antioxidant delivery system, a commercial sample of green tea extract (GT-FORT 101SF liquid by Kemin, Herjentals, Belgium) was dispersed in a blend of PKO and SFO (50/50 mix). Assuming a concentration of the active catechin compounds of 10 wt % in the dried tea leaves versus 75 wt % in the commercial extract, equivalent antioxidant concentrations of green tea extract in the oil blend were prepared. Details of the resulting fat blend compositions (#25, 26 and 27) containing green tea extract are given in table 2.

TABLE 2

| Composition # | Milling composition | $D_{3,2}$ (μm) | $D_{90,3}$ (μm) | Oil blend composition (weight-%) | Ratio PKO/SFO |
|---|---|---|---|---|---|
| 13 | 33% green tea bead milled in PKO + SFO (50/50) | 6.0 | 23.6 | 49.8% PKO, 49.8% SFO, 0.4% green tea | 1/1 |
| 14 | 33% green tea bead milled in PKO + SFO (50/50) | 6.0 | 23.6 | 49.6% PKO, 49.6% SFO, 0.8% green tea | 1/1 |
| 15 | 33% green tea bead milled in PKO + SFO (50/50) | 6.0 | 23.6 | 49.0% PKO, 49.0% SFO, 2.0% green tea | 1/1 |
| 16 | 33% green tea bead milled in PKO + SFO (50/50), inert | | | 49.8% PKO, 49.8% SFO, 0.4% green tea | 1/1 |
| 17 | 33% green tea bead milled in PKO + SFO (50/50), inert | | | 49.6% PKO, 49.6% SFO, 0.8% green tea | 1/1 |
| 18 | 33% green tea bead milled in PKO + SFO (50/50), inert | | | 49.0% PKO, 49.0% SFO, 2.0% green tea | 1/1 |
| 19 | 33% green tea HS-mixed in PKO + SFO (50/50) | 6.0 | 40.7 | 49.8% PKO, 49.8% SFO, 0.4% green tea | 1/1 |
| 20 | 33% green tea HS-mixed in PKO + SFO (50/50) | 6.0 | 40.7 | 49.6% PKO, 49.6% SFO, 0.8% green tea | 1/1 |
| 21 | 33% green tea HS-mixed in PKO + SFO (50/50) | 6.0 | 40.7 | 49.0% PKO, 49.0% SFO, 2.0% green tea | 1/1 |
| 22 | 33% green tea HS-mixed in PKO + SFO (50/50), inert | | | 49.8% PKO, 49.8% SFO, 0.4% green tea | 1/1 |
| 23 | 33% green tea HS-mixed in PKO + SFO (50/50), inert | | | 49.6% PKO, 49.6% SFO, 0.8% green tea | 1/1 |
| 24 | 33% green tea HS-mixed in PKO + SFO (50/50), inert | | | 49.0% PKO, 49.0% SFO, 2.0% green tea | 1/1 |
| 25 | NA | NA | NA | 50% PKO, 50% SFO, 500 ppm green tea extract | 1/1 |
| 26 | NA | NA | NA | 50% PKO, 49.9% SFO, 0.1% green tea extract | 1/1 |
| 27 | NA | NA | NA | 49.9% PKO, 49.8% SFO, 0.25% green tea extract | 1/1 |

Characterization of Oxidative Stability of the Suspensions Via Rancimat

The stability of the oil blend compositions containing green tea particles is characterized with the help of the Rancimat tool. The induction time before oxidation products are released from the heated and aerated oil is registered for this purpose. This test was performed on oil compositions containing micronized green tea particles (compositions #13-27, see table 2).

The Rancimat test was performed at 110° C. All measurements were performed in duplicates. As a measure for the oxidative stability of the oil blend composition, the induction time is plotted in FIG. 6.

As shown in FIG. 6 the addition of green tea particles into blends of PKO and SFO clearly increased their oxidative stability. Compared to the pure oil mix (50/50 blend of SFO and PKO), which is characterized by an induction time of 7.8 hours, the addition of 4000 ppm green tea micronized by bead milling (composition 13) results in an increase of the total induction time of 2.1 hours or 27% to 9.9 hours. A clear dose-response is found, when increasing the antioxidant concentration. At 2% micronized green tea addition (composition 15), the induction time is more than doubled (17.3 hours).

Comparing results with and without inertization, a slight positive impact is seen when the oil blend is processed by bead milling. The induction times of compositions 16, 17 and 18 are approximately 1 hour higher than those of the respective compositions without inert gas application (13, 14 and 15). No significant effect of inertization is observed if the green tea particles are dispersed with a high shear mixer (compositions 19-21 versus 22-24).

As the initial particle size of the matcha green tea powder is already quite small, the additional benefit of the bead milling treatment on antioxidant delivery is not obvious from the Rancimat results. Compared to a simple mix of matcha green tea particles in oil, significant improvements in the stability of the suspension are nevertheless observed linked to the dispersion intensity achieved via bead milling.

Example 3: Fat Blend Containing Micronized Rosemary Particles

Figure 8:
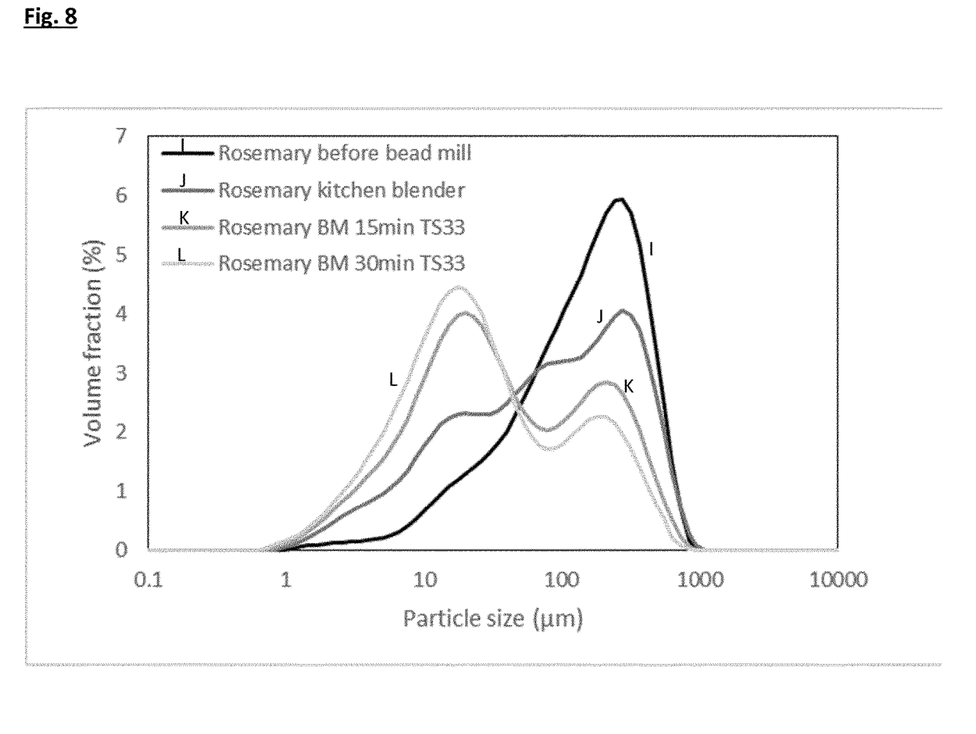
FIG. 8 shows the particle size distribution of rosemary in example 3 before bead milling (I), after milling in a kitchen blender (J), after 3.5 minutes bead milling at 33% total solids (K), and after 30 minutes bead milling at 33% total solids (L). The x-axis is size (μm) and the y-axis is volume fraction (%).

Dried rosemary needles were purchased from "Le monde des épices", Payerne, Switzerland and pre-ground to powder using a kitchen grinder. The obtained powder is still quite coarse, as shown in FIG. 8, its particle size distribution is characterized by a surface-weighed mean diameter (Sauter diameter or $D_{3,2}$) of 46 μm and a $D_{90}$ of 393 μm.

250 g of this rosemary powder were dispersed in a blend of 250 g coconut oil (FUJI OIL Europe Ertilor C 24/26) and 250 g sunflower oil (Florin, Switzerland) with the help of a high-shear rotor-stator mixer (Polytron Kinematika PT 3100, head PT DA 3020/2EC, 1 min at 18000 rpm. The resulting suspension of rosemary particles in oil (33% total solids, TS) is poured into grinding jars (volume: 125 ml) of the Retsch PM2 planetary ball mill, which were pre-heated to 50° C. Two thirds of the volume of each jar is filled with grinding media (2 mm $ZrO_2$ ceramic beads), one third is occupied by the oily suspension. The mill is run for 15 min and 30 min, respectively, at 500 rpm to micronize the rosemary particles. No active heating is required during milling to keep the coconut oil above its melting point, as the heat released from friction inside the grinding jars is sufficient. The product temperature after 30 min of milling is recorded with a contact thermometer, ranging from 70-75° C. The obtained particle size distributions after 15 and 30 min of bead milling are characterized by surface weighted mean diameters (Sauter diameter, $D_{3,2}$ of 13.1 and 10.8 μm, respectively. The $D_{90}$ is reduced to 260 μm after 15 min and to 208 μm after 30 min. The fibrous structure of Rosemary particles is very resistant to micronization, compared to the results presented above for coffee (example 1) and green tea (example 2).

For comparison, the same rosemary particles dispersed in oil are treated with a kitchen blender (Moulinex, La Moulinette XXL, run time 15 min) instead of by bead milling to achieve a dispersion of micronized rosemary in a 50/50 blend of coconut oil and sunflower oil. The obtained particle size distribution is characterized by a $D_{3,2}$ of 19.7 μm and a $D_{90}$ of 367 μm, also shown in FIG. 8. Clearly, the specific energy input of the kitchen blender is not sufficient to micronize rosemary particles effectively.

Three fat blend compositions were produced by mixing the suspensions bead milled for 30 min at TS33 with further sunflower oil (SFO) and coconut oil (CO) in such way that the weight ratio of coconut oil to sunflower oil equals 1:1 at rosemary concentrations of 100, 300 and 600 ppm. Details of the obtained compositions (#28-30) are given in table 3. In order to investigate the potential of increasing the oxidative stability of the fat blends by adding micronized rosemary particles, two reference compositions without addition of rosemary particles were produced. Composition #31 is a 50:50 mix of coconut oil and sunflower oil, without further treatment. Composition #32 consists of the same fat blend, which was further processed for 30 min in the bead mill.

Characterization of Oxidative Stability of the Suspensions Via Rancimat

The oxidative stability of the produced fat blends was characterized with the help of the Rancimat, which indicated the induction time before oxidation products are released from the heated and aerated oil. This test was performed on oil compositions containing micronized rosemary particles (composition #28-32, see table 3), which contain a rosemary particle concentrations between zero and 600 ppm.

The Rancimat test was performed at 110° C. All measurements were performed in duplicates. As a measure for the oxidative stability of the fat blend compositions, the induction time is plotted in FIG. 9.

Figure 9:
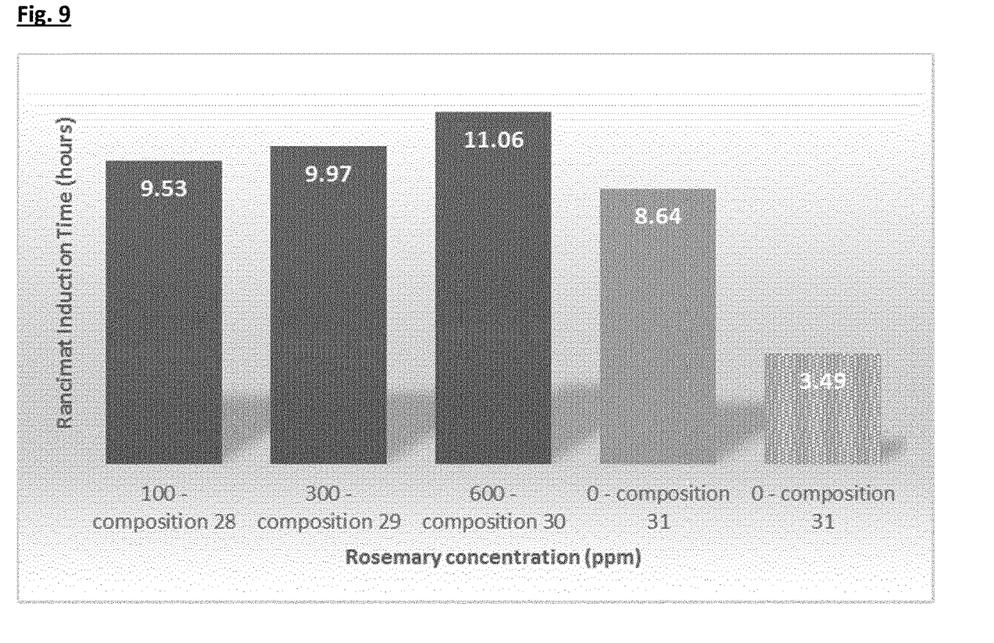
FIG. 9 is a plot of Rancimat induction time (h) for rosemary samples from example 3 at different concentrations.

It can be seen in FIG. 9 that micronized rosemary particles act as antioxidant delivery system. They are effective to increase the induction time of an unprocessed 50/50 mix of sunflower oil and coconut oil even at very low concentrations (100 ppm: +10%, 300 ppm: +15%, 600 ppm: +28%). For the composition described here, a noticeable detrimental effect of the bead milling treatment on the stability of the pure fat blend without addition of rosemary particles was observed, reducing the induction time by 60% compared to the unprocessed fat blend. This effect can most likely be attributed to thermal damage and air incorporation during the milling phase. Micronized rosemary particles show the potential not only to buffer this negative effect, but to improve the oxidative stability of the blend even further.

Example 4: Olive Oil Stabilized by Micronized Rosemary Particles 500 g of fully hydrogenated palm kernel oil having 97% saturated fat content is mixed with 500 g of rosemary powder (50% TS). The mixture is micronized for 30 minutes using a Retch PM2 planetary ball mill and then mixed into olive oil (SFA=14%) under an inert atmosphere to a total mass of 50 Kg. The resulting fat blend has a saturated fatty acid content of around 15%. Micronizing the rosemary at high total solids improves its ability to remain in suspension, and by performing the micronization in a high SFA oil which is resistant to oxidation, harmful initiation of oxidation is greatly reduced. Such a fat blend provides a bulk oil with enhanced stability which may be used in culinary applications.

Example 5: Coffee Mix Stabilized by Green Tea 500 g of palm kernel oil having 81% saturated fat content is mixed with 500 g of finely ground green tea leaves (50% TS). The mixture is micronized for 15 minutes using a Retch PM2 planetary ball mill and then mixed into 1.25 Kg of high oleic sunflower oil under inert atmosphere. The resulting stabilized fat blend (SFA around 30%) is combined with 2750 g maltodextrin and other coffee creamer ingredients and formed into a powdered coffee creamer. The resulting coffee creamer may be combined with soluble coffee and sugar to form a powdered coffee mix.

Example 6: Impact of Particle Size on Sedimentation

Green tea Sencha (Ujinotsuyu Seicha, Special. T; Nestlé) and saffron (Iranian saffron—"Le monde des épices", Payerne, Switzerland) were ground in oil using a ball mill or alternatively a pestle and mortar. The sedimentation of the resulting material was then compared. The green tea leaves were pre-ground in a Frewitt hammer mill (screen size 2 mm) to form a powder (G).

250 g of green tea powder was dispersed in a blend of 250 g coconut oil (FUJI OIL Europe Ertilor C 24/26) and 250 g sunflower oil (Florin, Switzerland) with the help of a high-shear rotor-stator mixer (Polytron Kinematika PT 3100, head PT DA 3020/2EC, 1 min at 18000 rpm. The resulting suspension of green tea in oil (33% total solids, TS) was poured into grinding jars (volume: 125 ml) of the Retsch PM2 planetary ball mill, which were pre-heated to 50° C. Two thirds of the volume of each jar is filled with grinding media (2 mm $ZrO_2$ ceramic beads), one third is occupied by the oily suspension. The mill is run for 30 min (in two periods of 15 min), at 500 rpm to micronize the green tea particles (M).

TABLE 3

| Composition # | Milling composition | $D_{3,2}$ (μm) | $D_{90,3}$ (μm) | Oil blend composition (weight-%) | Ratio CO/SFO |
|---|---|---|---|---|---|
| 28 | 33% rosemary bead milled in SFO:CO (50/50)I | 10.8 | 208 | 50% CO, 50% SFO, 100 ppm rosemary | 1/1 |
| 29 | 33% rosemary bead milled in SFO:CO (50/50)I | 10.8 | 208 | 50% CO, 50% SFO, 300 ppm rosemary | 1/1 |
| 30 | 33% rosemary bead milled in SFO:CO (50/50)I | 10.8 | 208 | 50% CO, 50% SFO, 600 ppm rosemary | 1/1 |
| 31 | NA | NA | NA | 50% CO, 50% SFO, | 1/1 |
| 32 | SFO:CO (50/50)I | NA | NA | 50% CO, 50% SFO, | 1/1 |

For comparison, the same green tea powder was ground by hand with a pestle and mortar (N). The powder was initially ground dry for 1 minute and then the oil mix was added (33% TS) before being ground for a further 5 minutes.

Figure 10:
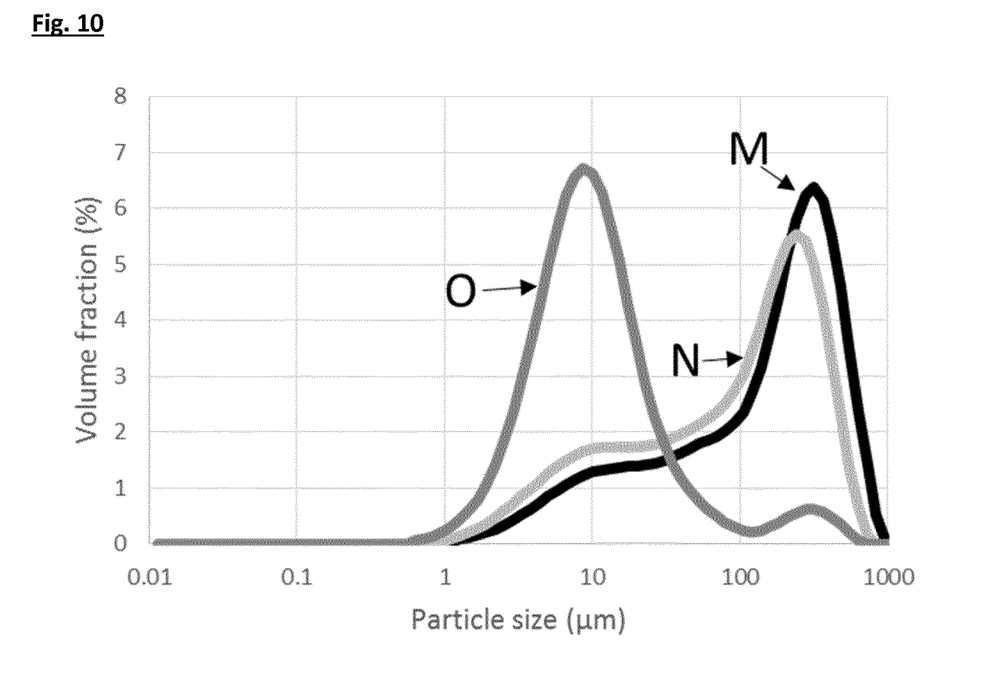
FIG. 10 shows the particle size distribution of green tea in example 6 before ball milling (M), after grinding in a pestle and mortar (N), and after ball milling (O). The x-axis is particle size (μm) and the y-axis is volume fraction (%).

Particle size results are shown in the table below, and plotted in FIG. 10. Only the ball mill produced micronized particles.

| Sample | Sample Name | D [4, 3] | D [3, 2] | $D_{10}$ | $D_{50}$ | $D_{90}$ |
|---|---|---|---|---|---|---|
| M | Green tea powder initial | 200.5 | 28.0 | 10.0 | 170.1 | 447.8 |
| N | Green tea pestle/mortar | 141.7 | 19.3 | 6.6 | 105.6 | 337.2 |
| O | Green tea ball mill | 25.4 | 6.2 | 3.0 | 8.7 | 34.7 |

Figure 11:
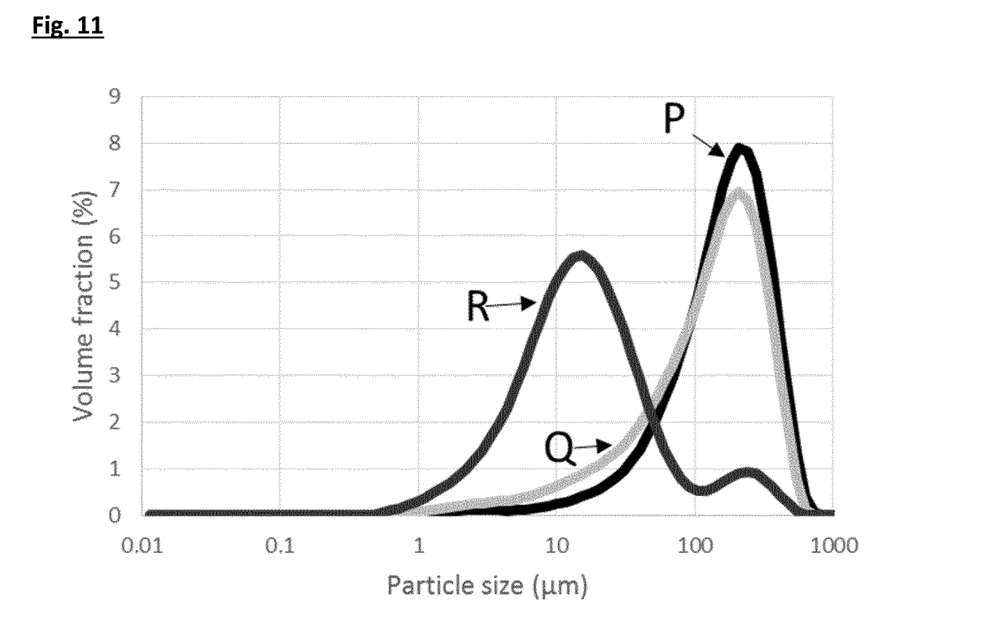
FIG. 11 shows the particle size distribution of saffron in example 6 before ball milling (P), after grinding in a pestle and mortar (Q), and after ball milling (R). The x-axis is particle size (μm) and the y-axis is volume fraction (%).

Saffron was prepared in the same manner, using a ball mill or a pestle and mortar. Particle size results are shown in the table below, and plotted in FIG. 11. Only the ball mill produced micronized particles.

| Sample | Sample Name | D [4, 3] | D [3, 2] | $D_{10}$ | $D_{50}$ | $D_{90}$ |
|---|---|---|---|---|---|---|
| P | Saffron powder initial | 179.3 | 56.0 | 42.7 | 159.7 | 343.997 |
| Q | Saffron pestle/mortar | 153.0 | 35.0 | 20.7 | 132.6 | 314.834 |
| R | Saffron ball mill | 34.144 | 7.827 | 3.57 | 13.963 | 64.554 |

Figure 12:
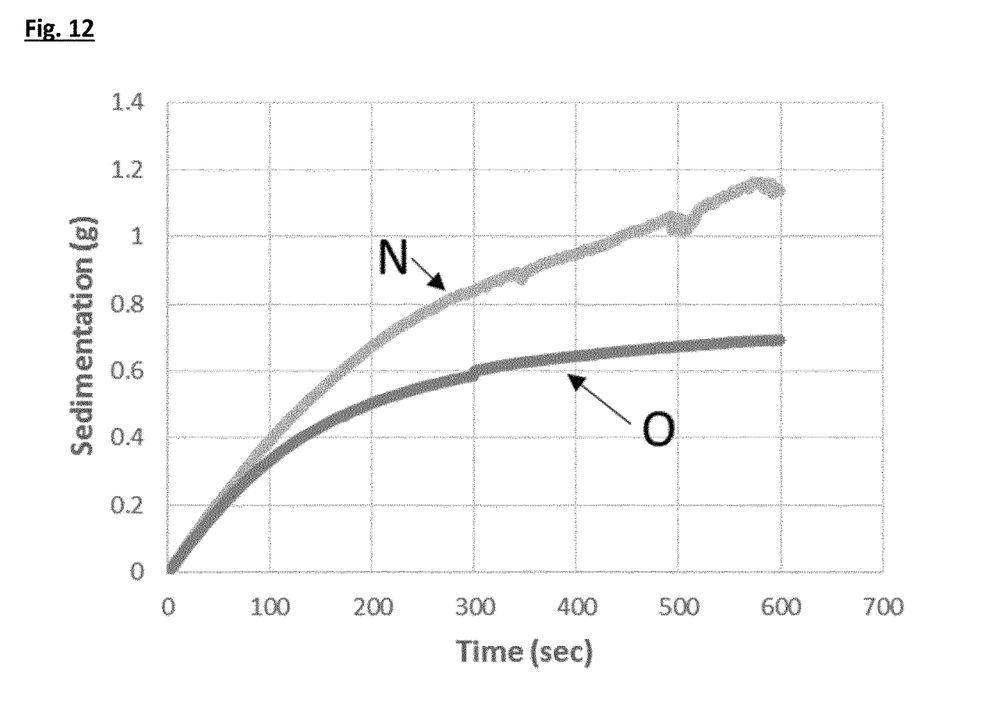
FIG. 12 is a plot of sedimentation results for green tea from example 6; after grinding in a pestle and mortar (N), and after ball milling (O). The x-axis is time (s) and the y-axis is sedimentation (g).
Figure 13:
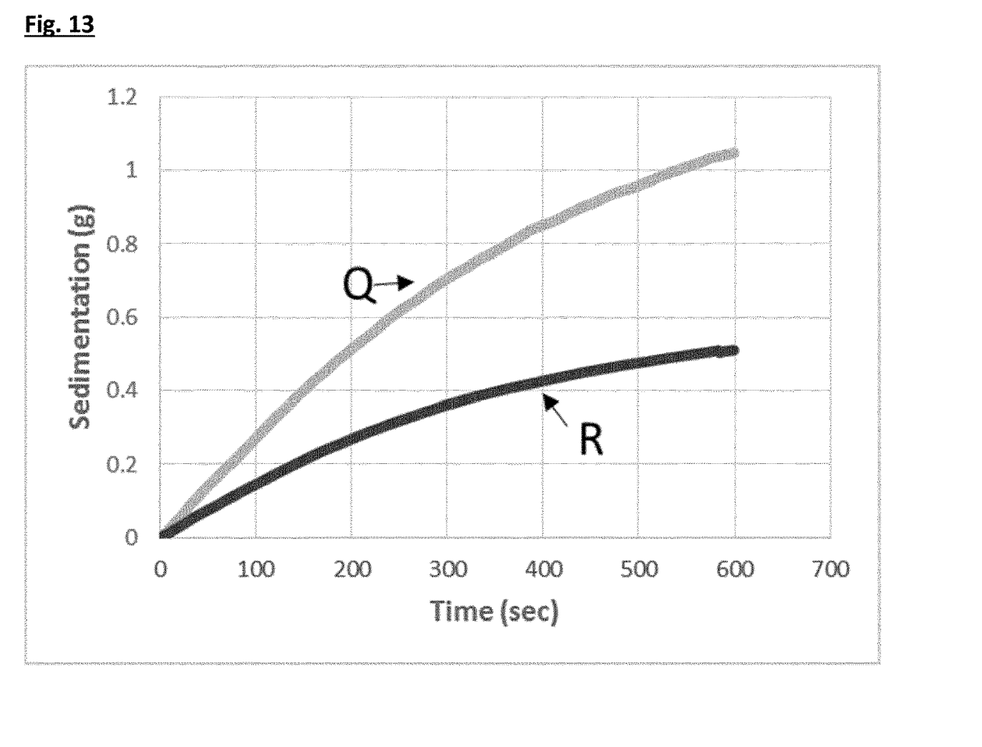
FIG. 13 is a plot of sedimentation results for saffron from example 6; after grinding in a pestle and mortar (Q), and after ball milling (R). The x-axis is time (s) and the y-axis is sedimentation (g).

The ground powders in oil were blended with further sunflower oil in a domestic blender to produce suspensions at 10 wt % and then sedimentation measurements performed as in Example 1 but at 20° C. The sedimentation graphs are shown in FIG. 12 (green tea) and FIG. 13 (saffron). The micronized (ball-milled) samples show approximately half the extent of sedimentation of the samples ground with a pestle and mortar. A composition comprising micronized antioxidant-containing vegetable material incorporated in the fat blend is required to limit sedimentation.

The invention claimed is:

1. A process for forming a stabilized fat blend, the process comprising:
   a) providing a composition comprising a first fat component and at least 30 wt. % antioxidant-containing vegetable material and grinding the composition to form micronized antioxidant-containing vegetable material incorporated in the first fat component; and
   b) adding a second fat component to the micronized antioxidant-containing vegetable material incorporated in the first fat component to form the stabilized fat blend such that the stabilized fat blend comprises less than 30 wt. % of the micronized antioxidant-containing vegetable material, wherein the first fat component has a higher saturated fatty acid content than the second fat component,
   wherein the stabilized fat blend has an induction time at least 17% higher than that of a control fat blend which does not include the micronized antioxidant-containing vegetable material and the stabilized fat blend has a formulation selected from the group consisting of:
   (i) the first fat component is between 70 and 90 wt. % of the stabilized fat blend, and the second fat component is between 10 and 30 wt. % of the stabilized fat blend, wherein the first fat component has a saturated fatty acid content between 40 and 50% of the first fat component, and the second fat component has a saturated fatty acid content between 5 and 15% of the second fat component;
   (ii) the first fat component is between 70 and 90 wt. % of the stabilized fat blend, and the second fat component is between 10 and 30 wt. % of the stabilized fat blend, wherein the first fat component has a saturated fatty acid content between 85 and 95% of the first fat component and the second fat component has a saturated fatty acid content between 5 and 15% of the second fat component;
   (iii) the first fat component is between 75 and 95 wt. % of the stabilized fat blend, and the second fat component is between 5 and 25 wt. % of the stabilized fat blend, wherein the first fat component has a saturated fatty acid content between 50 and 70% of the first fat component, and the second fat component has a saturated fatty acid content between 5 and 15% of the second fat component; and
   (iv) the first fat component is between 0.2 and 2 wt. % of the stabilized fat blend, and the second fat component is between 98 and 99.8 wt. % of the stabilized fat blend, wherein the first fat component has a saturated fatty acid content between 80 and 95% of the first fat component, and the second fat component has a saturated fatty acid content between 5 and 40% of the second fat component.

2. The process according to claim 1 wherein the antioxidant-containing vegetable material is selected from the group consisting of basil, bay, coriander, tea, coffee, cinnamon, rosemary and combinations of these.

3. The process according to claim 1 wherein the composition is ground using a device selected from the group consisting of a ball mill, a homogenizer, a high shear mixer, an impact mill and a roller mill.

4. The process according to claim 1 wherein step a) and/or step b) are performed under reduced pressure or under inert gas.

5. The process according to claim 1 wherein the composition in step a) contains more than 40% saturated fatty acids by weight of the total fatty acids in the composition.

6. The process according to claim 1, further comprising forming the stabilized fat blend of step (b) into an emulsion or a powder.

7. The process according to claim 1 wherein the quantity of the first fat component is such that the first fat component is present in the stabilized fat blend formed in step b) at a level between 70 and 90 wt. %, and the quantity of the second fat component is such that the second fat component is present in the stabilized fat blend formed in step b) at a level between 10 and 30 wt. %, wherein the first fat component has a saturated fatty acid content between 85 and 95% and the second fat component has a saturated fatty acid content between 5 and 15%.

8. The process according to claim 1 wherein the quantity of the first fat component is such that the first fat component is present in the stabilized fat blend formed in step b) at a level between 0.2 and 2 wt. %, and the quantity of the second fat component is such that the second fat component is present in the stabilized fat blend formed in step b) at a level between 98 and 99.8 wt. %, wherein the first fat component has a saturated fatty acid content between 80 and 95% and the second fat component has a saturated fatty acid content between 5 and 40%.

9. A composition comprising a fat blend and micronized antioxidant-containing vegetable material, the composition containing less than 90% saturated fatty acids by weight of the total fatty acids in the composition, wherein the fat blend comprises a first fat component and further comprises a second fat component, and the first fat component has a higher saturated fatty acid content than the second fat component,
wherein the fat blend has an induction time at least 17% higher than that of a control fat blend which does not include the micronized antioxidant-containing vegetable material and the fat blend has a formulation selected from the group consisting of:
(i) the first fat component is between 70 and 90 wt. % of the fat blend, and the second fat component is between 10 and 30 wt. % of the fat blend, wherein the first fat component has a saturated fatty acid content between 40 and 50% of the first fat component, and the second fat component has a saturated fatty acid content between 5 and 15% of the second fat component;
(ii) the first fat component is between 70 and 90 wt. % of the fat blend, and the second fat component is between 10 and 30 wt. % of the fat blend, wherein the first fat component has a saturated fatty acid content between 85 and 95% of the first fat component and the second fat component has a saturated fatty acid content between 5 and 15% of the second fat component;
(iii) the first fat component is between 75 and 95 wt. % of the fat blend, and the second fat component is between 5 and 25 wt. % of the fat blend, wherein the first fat component has a saturated fatty acid content between 50 and 70% of the first fat component, and the second fat component has a saturated fatty acid content between 5 and 15% of the second fat component; and
(iv) the first fat component is between 0.2 and 2 wt. % of the fat blend, and the second fat component is between 98 and 99.8 wt. % of the fat blend, wherein the first fat component has a saturated fatty acid content between 80 and 95% of the first fat component, and the second fat component has a saturated fatty acid content of between 5 and 40% of the second fat component.

10. The composition according to claim 9 wherein the micronized antioxidant-containing vegetable material has a Sauter mean diameter (D3,2) less than 12 μm.

11. The composition according to claim 9 wherein the fat blend comprises a high oleic vegetable oil.

12. The composition according to claim 10 wherein the composition is a food composition.

13. The composition according to claim 12 wherein the food composition is selected from the group consisting of a powdered beverage, a cereal product, a dairy product, a confectionery filling, an ice cream coating, a culinary sauce and a concentrated bouillon.

14. A method to protect a fat blend from oxidation, the method comprising adding a micronized antioxidant-containing vegetable material to the fat blend, wherein the fat blend comprises a first fat component and further comprises a second fat component, and the first fat component has a higher saturated fatty acid content than the second fat component,
wherein the fat blend has an induction time at least 17% higher than that of a control fat blend which does not include the micronized antioxidant-containing vegetable material and the fat blend has a formulation selected from the group consisting of:
(i) the first fat component is between 70 and 90 wt. % of the fat blend, and the second fat component is between 10 and 30 wt. % of the fat blend, wherein the first fat component has a saturated fatty acid content between 40 and 50% of the first fat component, and the second fat component has a saturated fatty acid content between 5 and 15% of the second fat component;
(ii) the first fat component is between 70 and 90 wt. % of the fat blend, and the second fat component is between 10 and 30 wt. % of the fat blend, wherein the first fat component has a saturated fatty acid content between 85 and 95% of the first fat component and the second fat component has a saturated fatty acid content between 5 and 15% of the second fat component;
(iii) the first fat component is between 75 and 95 wt. % of the fat blend, and the second fat component is between 5 and 25 wt. % of the fat blend, wherein the first fat component has a saturated fatty acid content between 50 and 70% of the first fat component, and the second fat component has a saturated fatty acid content between 5 and 15% of the second fat component; and
(iv) the first fat component is between 0.2 and 2 wt. % of the fat blend, and the second fat component is between 98 and 99.8 wt. % of the fat blend, wherein the first fat component has a saturated fatty acid content between 80 and 95% of the first fat component, and the second fat component has a saturated fatty acid content of between 5 and 40% of the second fat component.

15. The composition according to claim 9, wherein the first fat component is between 70 and 90 wt. % of the fat blend, and the second fat component is between 10 and 30 wt. % of the fat blend, wherein the first fat component has a saturated fatty acid content between 40 and 50% of the first fat component, and the second fat component has a saturated fatty acid content between 5 and 15% of the second fat component.

16. The composition according to claim 9, wherein the first fat component is between 70 and 90 wt. % of the fat blend, and the second fat component is between 10 and 30 wt. % of the fat blend, wherein the first fat component has a saturated fatty acid content between 85 and 95% of the first fat component and the second fat component has a saturated fatty acid content between 5 and 15% of the second fat component.

17. The composition according to claim 9, wherein the first fat component is between 75 and 95 wt. % of the fat blend, and the second fat component is between 5 and 25 wt. % of the fat blend, wherein the first fat component has a saturated fatty acid content between 50 and 70% of the first fat component, and the second fat component has a saturated fatty acid content between 5 and 15% of the second fat component.

18. The composition according to claim 9, wherein the first fat component is between 0.2 and 2 wt. % of the fat blend, and the second fat component is between 98 and 99.8 wt. % of the fat blend, wherein the first fat component has a saturated fatty acid content between 80 and 95% of the first fat component, and the second fat component has a saturated fatty acid content of between 5 and 40% of the second fat component.

* * * * *